(12) United States Patent
Gupta

(10) Patent No.: US 11,081,008 B2
(45) Date of Patent: Aug. 3, 2021

(54) VEHICLE VISION SYSTEM WITH CROSS TRAFFIC DETECTION

(71) Applicant: MAGNA ELECTRONICS INC., Auburn Hills, MI (US)

(72) Inventor: Nikhil Gupta, Brampton (CA)

(73) Assignee: MAGNA ELECTRONICS INC., Auburn Hills, MI (US)

(*) Notice: Subject to any disclaimer, the term of this patent is extended or adjusted under 35 U.S.C. 154(b) by 999 days.

(21) Appl. No.: 14/573,307

(22) Filed: Dec. 17, 2014

(65) Prior Publication Data

US 2015/0179074 A1 Jun. 25, 2015

Related U.S. Application Data

(60) Provisional application No. 61/919,131, filed on Dec. 20, 2013.

(51) Int. Cl.
*G08G 1/16* (2006.01)
*H04N 7/18* (2006.01)

(52) U.S. Cl.
CPC ............. *G08G 1/166* (2013.01); *H04N 7/183* (2013.01)

(58) Field of Classification Search
CPC ............................... G08G 1/166; H04N 7/183
USPC ........................................................ 348/148
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,038,577 B2 | 5/2006 | Pawlicki et al. | |
| 7,532,109 B2 | 5/2009 | Takahama et al. | |
| 7,720,580 B2 | 5/2010 | Higgins-Luthman | |
| 7,855,755 B2 | 12/2010 | Weller et al. | |
| 8,027,029 B2 | 9/2011 | Lu et al. | |
| 9,205,776 B2 | 12/2015 | Turk | |
| 9,319,637 B2 | 4/2016 | Lu et al. | |
| 2006/0217886 A1* | 9/2006 | Fujimoto | G06T 7/20 701/300 |
| 2006/0256198 A1* | 11/2006 | Nishiuchi | G06K 9/00805 348/148 |
| 2007/0177011 A1* | 8/2007 | Lewin | B62D 15/0285 348/118 |

(Continued)

FOREIGN PATENT DOCUMENTS

WO WO 2012145819 * 11/2012

*Primary Examiner* — Jamie J Atala
*Assistant Examiner* — Kathleen V Nguyen
(74) *Attorney, Agent, or Firm* — Honigman LLP

(57) ABSTRACT

A vision system of a vehicle includes a camera disposed at a vehicle and having a field of view exterior of the vehicle. The camera may have a wide angle lens with more distortion at side regions of the field of view than at a center region of the field of view. An image processor processes captured image data to determine gradient information of captured image data, and responsive to processing gradient information, determines a potential cross traffic object at one of the side regions of the field of view. The image processor processes multiple frames of captured image data to determine movement of an upper portion and a lower portion of a gradient of the determined potential cross traffic object and, responsive to such processing, determines if the detected potential cross traffic object is a cross traffic object that is moving into a path of the vehicle.

20 Claims, 4 Drawing Sheets

(56) References Cited

U.S. PATENT DOCUMENTS

| | | | |
|---|---|---|---|
| 2010/0002081 A1* | 1/2010 | Pawlicki | G06T 7/13 |
| | | | 348/148 |
| 2013/0250114 A1 | 9/2013 | Lu | |
| 2014/0043473 A1 | 2/2014 | Gupta et al. | |
| 2014/0169627 A1 | 6/2014 | Gupta | |
| 2015/0042799 A1* | 2/2015 | Zhang | H04N 7/18 |
| | | | 348/148 |
| 2015/0049193 A1 | 2/2015 | Gupta | |
| 2015/0175072 A1 | 6/2015 | Sabeti | |
| 2015/0178576 A1 | 6/2015 | Gupta | |
| 2016/0075332 A1 | 3/2016 | Edo-Ros | |

* cited by examiner

VEHICLE VISION SYSTEM WITH CROSS TRAFFIC DETECTION

CROSS REFERENCE TO RELATED APPLICATION

The present application is related to U.S. provisional application Ser. No. 61/919,131, filed Dec. 20, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

The present invention provides for detection of cross traffic objects (via image processing of image data captured by a forward or rearward viewing camera of the vehicle), in order to detect the presence and approach of an object at a high angle (to either side) of the vehicle and ahead or behind the vehicle, where that object may move to be in the forward or rearward path of travel of the equipped vehicle. Responsive to such determination of cross traffic objects, the system may display an image of the detected object or may generate an alert to the driver of the vehicle to alert the driver to the presence of the detected cross traffic object.

The vehicular vision system of the present invention includes a camera disposed at a vehicle and having a field of view exterior of the vehicle. The camera may have a wide angle lens with more distortion at the side regions of the field of view than at a center region of the field of view. An image processor processes captured image data to determine gradient information (such as intensity gradients of objects) of captured image data, and responsive to processing gradient information, determines a potential cross traffic object at one of the side regions of the field of view (such as via determination of a vertical or generally vertical edge of an intensity gradient at a side region of the field of view of the camera, such as may be indicative of an object just entering the camera's field of view). The image processor processes multiple frames of captured image data to determine movement of an upper portion and a lower portion of a gradient of the determined potential cross traffic object and, responsive to such processing, determines if the detected potential cross traffic object is a cross traffic object that is moving into the path of the vehicle. For example, the image processor may determine or track relative movement of the upper portion of the gradient relative to the lower portion of the gradient to determine if such movement is indicative of an object crossing the field of view of the camera from the side region of the field of view towards the center region of the field of view (and thus potentially into the path of travel of the vehicle).

The vision system of the present invention thus may determine cross traffic objects via processing of only a relatively small number (such as only two) of data points or the like as they traverse the camera's field of view. Thus, the vision system may provide cross traffic detection with reduced image processing requirements. The present invention provides for enhanced detection of such cross traffic objects or vehicles, and may do so using a lower resolution camera, by using edge/gradient information extracted from the captured image data.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
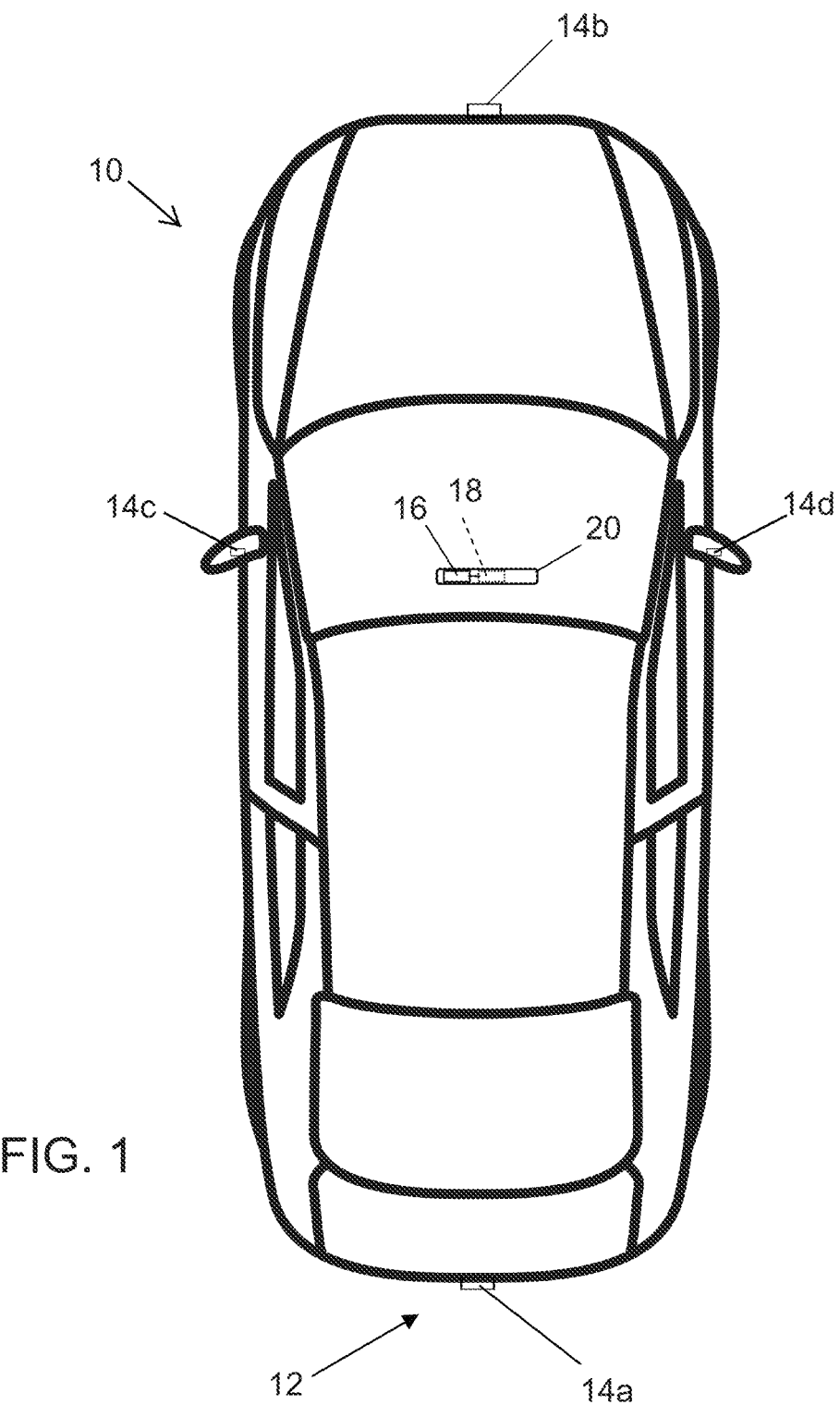
FIG. 1 is a plan view of a vehicle with a vision system that incorporates cameras in accordance with the present invention.
Figure 2:
FIG. 2 is an image captured by a fisheye camera showing objects at high angles relative to the camera axis.
Figure 3:
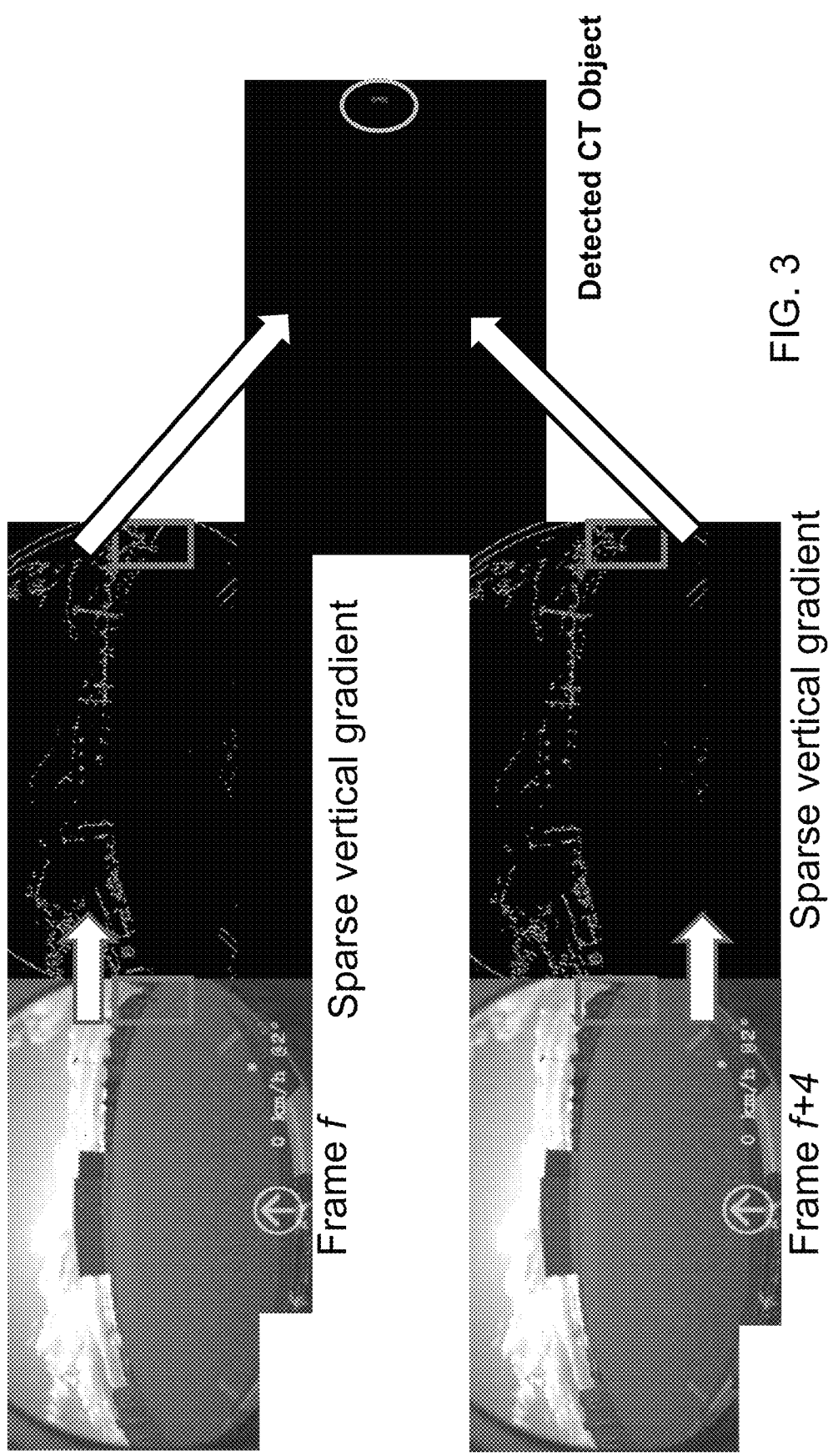
FIG. 3 are images showing how an object or person is detected using vertical gradient detection in accordance with the present invention.
Figure 4:
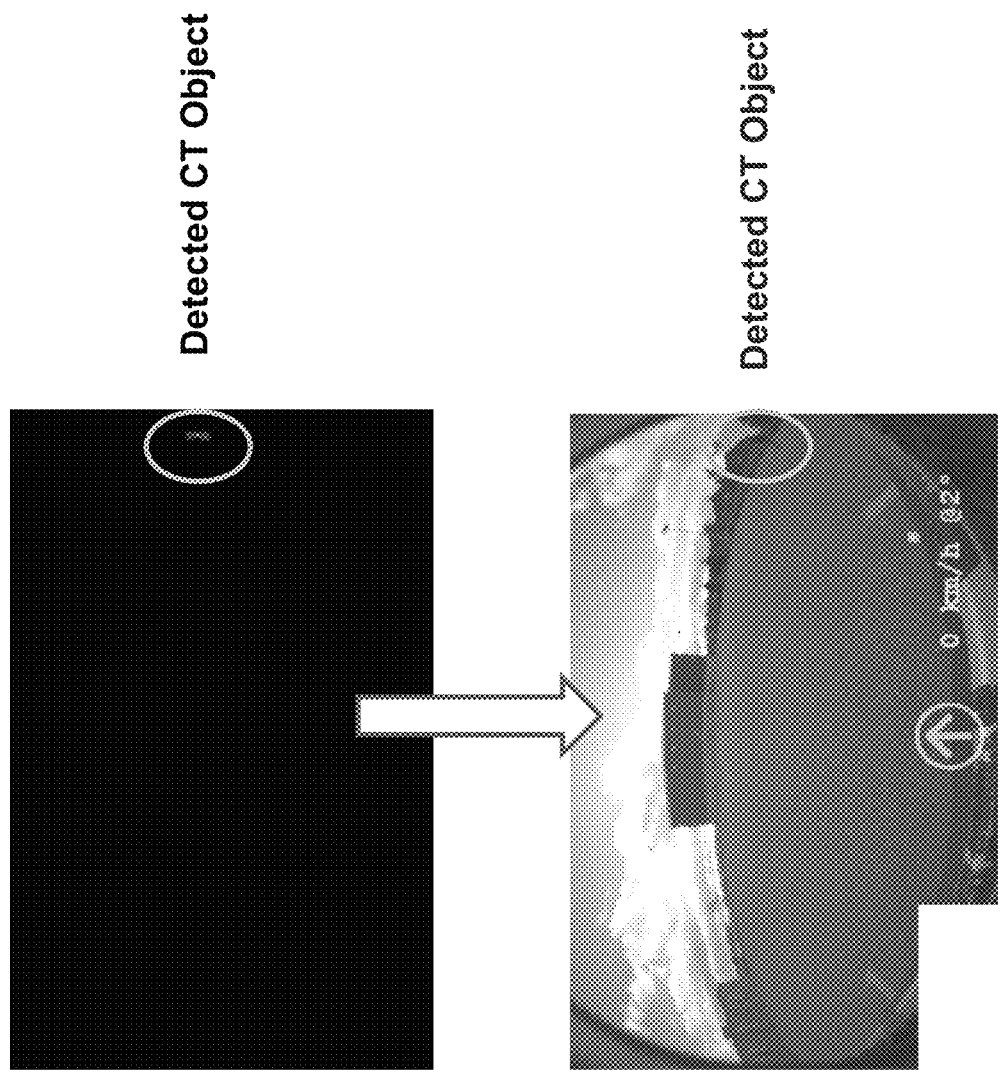
FIG. 4 are images showing the detected cross traffic object.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/ rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a vision system that processes captured image data (captured by a forward or rearward facing camera) to determine the presence and/or approach of a cross traffic object that may cross the forward or rearward path of travel of the equipped vehicle. The present invention provides for enhanced detection of such cross traffic objects or vehicles when using a lower resolution camera by using edge/gradient information extracted from the captured image data, as discussed below.

The cross traffic information typically occupies the pixel space in images that is among the most distorted and has the lowest resolution (at the side regions of the captured images). Because the cross traffic objects that need to be detected occur to the extreme left or right of the vehicle, they require fish-eye optics to be viewed by the camera and occupy the high angular field of view area in the fish-eye images. Because of their small size, high distortion and low motion (in the captured image), it is generally difficult to extract this information and it is preferred to use the highest possible resolution for processing this data. The present invention is operable to extract the cross traffic information with high reliability from the high angular field of view area using the lower resolution images.

Because the vision system of the present invention may use lower resolution images and may have a more robust extraction, the system can implement the algorithm using reduced cost resources while at the same time can detect the objects at a greater distance, thus having larger warning times for the time to collision.

To achieve the above, the edge/gradient information from the low resolution (VGA) image is used and processed so the image processor can extract potential candidates based on certain predefined criteria. For example, the intensity gradient information can be processed, such as by using an edge detection algorithm or the like, to determine if detected edges may be indicative of a cross traffic object, such as an object that is just entering the field of view of the camera from laterally outward of the field of view of the camera (in other words, entering the field of view of the camera and traveling in a direction across the camera's field of view). If the detected edges meet the criteria and thus are possibly indicative of a cross traffic object, the system may identify them as a potential cross traffic object candidate. These candidates are then tracked over multiple frames of captured image data and may be tracked over a time period or variable amount of time or (based on their speed). Using this tracking information, the movement between the top and bottom points of the gradient (such as a vertical intensity gradient of the tracked candidate) is differentially compared to estimate if the object is a two dimensional (2D) object or a three dimensional (3D) object. Because of the robustness of the gradients against low contrast and their ability to be tracked longer across slow motion, such processing allows the system to find smaller objects across larger distances.

Without this development it may be difficult to achieve the required performance accuracy required without significant processing power needed to process higher resolution images. Even then, contrast issues would hinder or limit reliable detection of certain objects.

Surround awareness and driver assistance is a key marketable feature for a vehicles. Generic object detection using fish eye camera is one such feature. A cross traffic alert function may be part of a driver assistant system (DAS) feature-set and may add value to existing feature portfolios and/or act as a standalone feature for both multi-camera vision systems as well as low cost rear view cameras.

The system may warn the driver using multiple human-machine interfaces (HMIs). The system may determine a differentiation between objects in the vehicle path versus cross traffic objects. The system may, responsive to a determination of cross traffic objects, generate an alert to the driver of the vehicle. The alert may comprise a visual alert if the determined or predicted time to collision (TTC) is greater than a threshold time period and may also or otherwise provide an audible alert if the determined or predicted TTC is under the threshold time period.

Using a front facing or forward viewing camera and/or a rear facing or rearward viewing camera, the detection of cross traffic objects or vehicles may be done at a high angular field of view. The need for a high angular field of view may necessitate the use of wide angle or fish-eye lens cameras.

There is an increase in the use of fish-eye optics with the developing market interest in smart rear view cameras and surround view systems. The sensor resolution of a vehicle camera may be at least about one megapixel, and may be two megapixels or four megapixels or more.

Cross traffic detection involves processing of data in the high angular field of view (FOV) areas, where there is the highest distortion and lowest resolution, and where there is very little pixel motion. Typically, to process this area, the highest possible resolution is desired. This poses counter-intuitive requirements for low-cost development, since to process the high resolution data, more expensive processors may be required. Further, use of optical flow or pixel evaluation does not yield sensitive and accurate results at a large distance range because of high distortion and very low apparent movement of the pixels. Also, given the overlap of this area with the horizon, the contrast of the objects against dark backgrounds may pose challenges.

The present invention provides a differential gradient-based cross traffic detection system. The vision system may use low resolution fish-eye images (such as low resolution VGA (for example, 640×400) images or the like). Because the gradients of the objects successfully encode their location and movement information, the system may use gradients for detection. Typically, vertical gradients are sufficient since all three dimensional (3D) objects have a vertical component. Optionally, however, the system processing can be extended to a combination of horizontal and vertical gradients.

Gradients basically provide a sparse representation of the image and thus require only a very limited dataset to be stored and/or processed for long term tracking. By tracking the end-points of the gradients, it is possible to track the movement of the object. This keeps the computational complexity low, and would still work if the gradient represents only partial object because of background contrast issues.

It is possible to remove non-relevant cases by evaluating the back-projected distance of the base of the gradient, whereby all objects that have their bases above the horizon can be rejected. The differential movement of the tracked gradients is evaluated to verify of the object is planar (2D) versus three dimensional (3D). The differential formulation of the tracked gradient information is sufficient to evaluate the 2D versus 3D question or determination. Because a sparse or reduced amount of data is stored and tracked, the gradients can be tracked across several frames before a decision has to be evaluated. This allows more physical movement to occur and thus overcomes the slow motion in this image area.

Because structure from motion or other 3D reconstruction techniques are ineffective at this distance range, the gradients determined in the captured image data also serve to provide meaningful information about the location of the object (via back-projection). Evaluating the long-term trajectory of an object allows its differentiation as a cross traffic object versus an in path object.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and published on Dec. 24, 2014 as International Publication No. WO 2014/204794, and/or U.S. patent application Ser. No. 14/535,739, filed Nov. 7, 2014, now U.S. Pat. No. 9,451,138; Ser. No. 14/524,203, filed Oct. 27, 2014, now U.S. Pat. No. 9,457,717; Ser. No. 14/519,469, filed Oct. 21, 2014, now U.S. Pat. No. 9,881,220; Ser. No. 14/391,841, filed Oct. 10, 2014, now U.S. Pat. No. 9,751,465; Ser. No. 14/489,659, filed Sep. 18, 2014, now U.S. Pat. No. 10,908,417; Ser. No. 14/466,099, filed Aug. 22, 2014, now U.S. Pat. No. 9,712,002; Ser. No. 14/377,940, filed Aug. 11, 2014, now U.S. Pat. No. 10,493,916; Ser. No. 14/377,939, filed Aug. 11, 2014, now U.S. Pat. No. 9,871,971; Ser. No. 14/456,164, filed Aug. 11, 2014, now U.S. Pat. No. 9,619,716; Ser. No. 14/456,163, filed Aug. 11, 2014, which published on Feb. 12, 2015 as U.S. Patent Publication US-2015-0042807; Ser. No. 14/456,162, filed Aug. 11, 2014, now U.S. Pat. No. 10,326,969; Ser. No. 14/373,501, filed Jul. 21, 2014, and published on Jan. 29, 2015 as U.S. Patent Publication US-2015-0028718; Ser. No. 14/372,524, filed Jul. 16, 2014, and published on Jan. 22, 2015 as U.S. Patent Publication US-2015-0028781; Ser. No. 14/324,696, filed Jul. 7, 2014, now U.S. Pat. No. 9,701,258; Ser. No. 14/369,229, filed Jun. 27, 2014, now U.S. Pat. No. 9,491,342; Ser. No. 14/316,940, filed Jun. 27, 2014, and published on Jan. 8, 2015 as U.S. Patent Publication No. US-2015-0009010; Ser. No. 14/316,939, filed Jun. 27, 2014, now U.S. Pat. No. 10,755,110; Ser. No. 14/303,696, filed Jun. 13, 2014, now U.S. Pat. No. 9,609,757; Ser. No. 14/303,695, filed Jun. 13, 2014, and published on Dec. 25, 2014 as U.S. Patent Publication No. US-2014-0375476; Ser. No. 14/303,694, filed Jun. 13, 2014, now U.S. Pat. No. 9,260,095; Ser. No. 14/303,693, filed Jun. 13, 2014, and published on Dec. 18, 2014 as U.S. Patent Publication US-2014-0368654; Ser. No. 14/297,663, filed Jun. 6, 2014, now U.S. Pat. No. 10,567,705; Ser. No. 14/362,636, filed Jun. 4, 2014, now U.S. Pat. No. 9,762,880; Ser. No. 14/290,028, filed May 29, 2014, now U.S. Pat. No.

9,800,794; Ser. No. 14/290,026, filed May 29, 2014, now U.S. Pat. No. 9,476,398; Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published on Nov. 6, 2014 as U.S. Patent Publication US-2014-0327772; Ser. No. 14/264,443, filed Apr. 29, 2014, now U.S. Pat. No. 10,232,797; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published on Aug. 7, 2014 as U.S. Patent Publication US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published on Aug. 7, 2014 as U.S. Patent Publication US-2014-0218529; Ser. No. 14/169,328, filed Jan. 31, 2014, now U.S. Pat. No. 9,092,986; Ser. No. 14/163,325, filed Jan. 24, 2014, and published on Jul. 31, 2014 as U.S. Patent Publication US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published on Jun. 19, 2014 as U.S. Patent Publication US-2014-0168437; Ser. No. 14/098,817, filed Dec. 6, 2013, and published on Jun. 19, 2014 as U.S. Patent Publication US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication US-2014-0025240; Ser. No. 13/942,753, filed Jul. 16, 2013, and published on Jan. 30, 2014 as U.S. Patent Publication US-2014-0028852; Ser. No. 13/927,680, filed Jun. 26, 2013, and published on Jan. 2, 2014 as U.S. Patent Publication US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, now U.S. Pat. No. 10,609,335; Ser. No. 13/847,815, filed Mar. 20, 2013, and published on Oct. 21, 2013 as U.S. Patent Publication US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Patent Publication US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publicatioin US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, and published on Jan. 3, 2013 as U.S. Patent Publication US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744;

6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
   a camera disposed at a vehicle and having a field of view exterior of the vehicle;
   wherein said camera has a wide angle lens with more optical distortion at side regions of the field of view than at a center region of the field of view;
   wherein said camera is operable to capture frames of image data;
   an image processor operable to process image data captured by said camera;
   wherein said image processor, responsive to image processing of a frame of captured image data, determines gradient information of the frame of captured image data, and wherein the determined gradient information comprises information indicative of intensity gradients present in the scene viewed by said camera;
   wherein said image processor, responsive at least in part to the determined gradient information, determines edges of intensity gradients at one of the side regions of the field of view where the captured image data has more optical distortion and lower resolution and less pixel motion as compared to the center region of the field of view;
   wherein said vision system, responsive to determined edges of intensity gradients, determines presence of a potential cross traffic object at the side region of the field of view where the captured image data has more optical distortion and lower resolution and less pixel motion as compared to the center region of the field of view;
   wherein said image processor processes multiple frames of captured image data to determine movement of an upper portion of a determined edge of an intensity gradient of the determined potential cross traffic object and a lower portion of the determined edge of the intensity gradient of the determined potential cross traffic object at the side region of the field of view where the captured image data has more optical distortion and lower resolution and less pixel motion as compared to the center region; and
   wherein said vision system, responsive to said image processor processing multiple frames of captured image data and determining movement of the upper portion of the determined edge of the intensity gradient of the determined potential cross traffic object relative to the lower portion of the determined edge of the intensity gradient of the determined potential cross traffic object at the side region of the field of view where the captured image data has more optical distortion and lower resolution and less pixel motion as compared to the center region, determines if the determined potential cross traffic object is a three dimensional cross traffic object that is moving toward the center region of the field of view and toward a predicted path of the vehicle.

2. The vision system of claim 1, wherein said vision system determines movement between the upper and lower portions of the determined edge of the intensity gradient of the determined potential cross traffic and differentially compares the movements to determine if the determined potential cross traffic object is a three dimensional cross traffic object that is moving toward the center region of the field of view and toward the predicted path of the vehicle.

3. The vision system of claim 1, wherein said image processor processes gradient information using an edge detection algorithm.

4. The vision system of claim 1, wherein the vision system determines movement between top and bottom points of the determined edge of the intensity gradient of the determined potential cross traffic object to track movement of the determined potential cross traffic object.

5. The vision system of claim 1, wherein said vision system determines movement between top and bottom points of a vertical intensity gradient.

6. The vision system of claim 1, wherein said vision system determines movement between top and bottom points of a vertical intensity gradient to estimate if the determined potential cross traffic object is a two dimensional object or a three dimensional object.

7. The vision system of claim 1, wherein said camera outputs a low resolution video graphics array (VGA) image that is processed by said image processor.

8. The vision system of claim 1, wherein said camera is disposed at a forward portion of the vehicle and has a forward field of view.

9. The vision system of claim 8, wherein said wide angle lens comprises a fish eye lens.

10. The vision system of claim 1, wherein said camera is disposed at a rearward portion of the vehicle and has a rearward field of view.

11. The vision system of claim 1, wherein said vision system processes multiple frames of captured image data to track the upper and lower portions of the determined edge of the intensity gradient of the determined potential cross traffic object over a variable amount of time, and wherein the variable amount of time is varied responsive to an estimated speed of travel of the determined potential cross traffic object relative to the vehicle.

12. A vision system of a vehicle, said vision system comprising:
   a camera disposed at a vehicle and having a field of view exterior of the vehicle;
   wherein said camera has a wide angle lens with more optical distortion at side regions of the field of view than at a center region of the field of view;
   wherein said camera is operable to capture frames of image data;
   an image processor operable to process image data captured by said camera;
   wherein said image processor, responsive to image processing of a frame of captured image data, determines intensity gradient information of the frame of captured image data, and wherein the determined intensity gradient information comprises information indicative of intensity gradients present in the scene viewed by said camera;
   wherein said image processor, responsive at least in part to the determined intensity gradient information, determines edges, using an edge detection algorithm, of intensity gradients at one of the side regions of the field of view where the captured image data has more optical distortion and lower resolution and less pixel motion as compared to the center region of the field of view;

wherein said vision system, responsive to determined edges of intensity gradients, determines presence of a potential cross traffic object at the side region of the field of view where the captured image data has more optical distortion and lower resolution and less pixel motion as compared to the center region of the field of view;

wherein said image processor processes multiple frames of captured image data to determine movement of an upper portion of a of a determined edge of an intensity gradient of the determined potential cross traffic object relative to a lower portion of the determined edge of the intensity gradient of the determined potential cross traffic object at the side region of the field of view where the captured image data has more optical distortion and lower resolution and less pixel motion as compared to the center region; and wherein said vision system, responsive to said image processor processing multiple frames of captured image data and determining movement of the upper portion of the determined edge of the intensity gradient of the determined potential cross traffic object relative to the lower portion of the determined edge of the intensity gradient of the determined potential cross traffic object at the side region of the field of view where the captured image data has more optical distortion and lower resolution and less pixel motion as compared to the center region, determines if the determined potential cross traffic object is a cross traffic object that is moving toward the center region of the field of view and toward a predicted path of the vehicle.

13. The vision system of claim 12, wherein said vision system differentially compares the movement of the upper portion of the determined edge of the intensity gradient relative to the lower portion of the determined edge of the intensity gradient to determine if the determined potential cross traffic object is a three dimensional cross traffic object that is moving toward the center region of the field of view and toward the predicted path of the vehicle.

14. The vision system of claim 12, wherein the vision system determines movement between the upper and lower portions of the determined edge of the intensity gradient of the determined potential cross traffic object to track movement of the determined potential cross traffic object.

15. The vision system of claim 12, wherein said camera is disposed at a forward portion of the vehicle and has a forward field of view.

16. The vision system of claim 12, wherein said camera is disposed at a rearward portion of the vehicle and has a rearward field of view.

17. The vision system of claim 12, wherein said vision system processes multiple frames of captured image data to track the upper and lower portions of the determined edge of the intensity gradient of the determined potential cross traffic object over a variable amount of time, and wherein the variable amount of time is varied responsive to an estimated speed of travel of the determined potential cross traffic object relative to the vehicle.

18. A vision system of a vehicle, said vision system comprising:
a camera disposed at a vehicle and having a field of view exterior of the vehicle;
wherein said camera has a wide angle lens with more optical distortion at side regions of the field of view than at a center region of the field of view;
wherein said camera is operable to capture frames of image data;
an image processor operable to process image data captured by said camera;
wherein said image processor, responsive to image processing of a frame of captured image data, determines gradient information of the frame of captured image data, and wherein the determined gradient information comprises information indicative of intensity gradients present in the scene viewed by said camera;
wherein said image processor, responsive at least in part to the determined gradient information, determines edges of intensity gradients at one of the side regions of the field of view where the captured image data has more optical distortion and lower resolution and less pixel motion as compared to the center region of the field of view;
wherein said vision system, responsive to determined edges of intensity gradients, determines presence of a potential cross traffic object at the side region of the field of view where the captured image data has more optical distortion and lower resolution and less pixel motion as compared to the center region of the field of view;
wherein said image processor processes multiple frames of captured image data to determine movement of an upper portion of a determined edge of an intensity gradient of the determined potential cross traffic object relative to a lower portion of the determined edge of the intensity gradient of the determined potential cross traffic object at the side region of the field of view where the captured image data has more optical distortion and lower resolution and less pixel motion as compared to the center region; and
wherein said image processor processes multiple frames of captured image data and said vision system tracks relative movement of the upper portion of the determined edge of the intensity gradient of the determined potential cross traffic object and the lower portion of the determined edge of the intensity gradient at the side region of the field of view where the captured image data has more optical distortion and lower resolution and less pixel motion as compared to the center region to determine if the determined potential cross traffic object is indicative of a cross traffic object that is moving toward the center region of the field of view and toward a predicted path of the vehicle.

19. The vision system of claim 18, wherein said camera is disposed at a rearward portion of the vehicle and has a rearward field of view.

20. The vision system of claim 18, wherein said vision system processes multiple frames of captured image data to track the upper and lower portions of the determined edge of the intensity gradient of the determined potential cross traffic object over a variable amount of time, and wherein the variable amount of time is varied responsive to an estimated speed of travel of the determined potential cross traffic object relative to the vehicle.

* * * * *